US008881360B2

(12) United States Patent
Townsend et al.

(10) Patent No.: US 8,881,360 B2
(45) Date of Patent: Nov. 11, 2014

(54) SOFTWARE AND METHODS FOR AUTOMATED PALLET INSPECTION AND REPAIR

(75) Inventors: Steve Townsend, Chatswood (AU); Michael David Lucas, Chatswood (AU)

(73) Assignee: Chep Technology Pty Limited, Sydney (AU)

( * ) Notice: Subject to any disclaimer, the term of this patent is extended or adjusted under 35 U.S.C. 154(b) by 444 days.

(21) Appl. No.: 13/102,414

(22) Filed: May 6, 2011

(65) Prior Publication Data

US 2011/0257776 A1 Oct. 20, 2011

Related U.S. Application Data

(62) Division of application No. 10/582,817, filed as application No. PCT/AU2004/001776 on Dec. 17, 2004.

(30) Foreign Application Priority Data

Dec. 19, 2003 (AU) ................................. 2003907024

(51) Int. Cl.
*B23P 6/00* (2006.01)
*B23Q 17/00* (2006.01)
*B23P 21/00* (2006.01)
*B23P 19/04* (2006.01)

(52) U.S. Cl.
CPC ................................. *B23P 19/041* (2013.01)
USPC .................. 29/402.01; 29/407.05; 29/407.09; 29/705; 29/703; 29/702; 73/865.8

(58) Field of Classification Search
USPC .............. 29/402.01, 407.01, 407.05, 407.09, 29/407.1, 702, 703, 705; 73/865.8
See application file for complete search history.

(56) References Cited

U.S. PATENT DOCUMENTS

| 4,743,154 A | 5/1988 | James et al. ................ 414/788.5 |
| 4,807,991 A | 2/1989 | Carew ................................. 56/72 |
| 4,827,142 A | 5/1989 | Hatje ............................. 250/563 |
| 5,070,996 A | 12/1991 | Schwaemmle et al. ..... 198/465.3 |
| 5,297,059 A | 3/1994 | Kawasoe ....................... 702/121 |
| 5,630,695 A | 5/1997 | McDonnell ................. 414/751.1 |
| 6,064,759 A | 5/2000 | Buckley et al. ............... 382/154 |
| 6,079,939 A | 6/2000 | Smets .......................... 14/798.5 |
| 6,522,993 B1 | 2/2003 | Tomko .............................. 2/150 |
| 6,700,563 B1 | 3/2004 | Koizumi ....................... 345/156 |

(Continued)

FOREIGN PATENT DOCUMENTS

| DE | 19645553 A1 | 5/1998 | ................ B07C 5/36 |
| EP | 465233 | 2/1981 | ............. G01N 21/88 |

(Continued)

*Primary Examiner* — Essama Omgba
(74) *Attorney, Agent, or Firm* — Allen, Dyer, Doppelt, Milbrath & Gilchrist, P.A.

(57) ABSTRACT

An automated pallet inspection and repair apparatus comprises an inspection station and a repair station. The inspection station comprises a laser that illuminates a pallet, a camera that collects the reflected light and a computer system. The computer system analyses the output of the camera and acquires the pallet's geometry and topography. The design of the pallet is determined by the computer software. A decision to repair the pallet is made by comparing acquired pallet data against the design criteria. If the pallet needs repair, a recipe of repair steps is constructed by inspecting each of the pallet's elements. The recipe is transmitted to the automated repair station.

14 Claims, 3 Drawing Sheets

(56) References Cited

U.S. PATENT DOCUMENTS

| | | | |
|---|---|---|---|
| 6,701,615 B2 * | 3/2004 | Harding et al. | 29/889.1 |
| 6,892,592 B2 | 5/2005 | Gatteschi | 73/865.8 |
| 7,150,598 B2 | 12/2006 | Smets et al. | 414/778 |
| 7,340,971 B2 | 3/2008 | Carter et al. | 73/865.9 |
| 7,765,668 B2 | 8/2010 | Townsend et al. | 29/407.04 |
| 2006/0174714 A1 * | 8/2006 | Benea et al. | 73/824 |
| 2006/0249436 A1 | 11/2006 | Hardman et al. | 209/699 |
| 2007/0107212 A1 | 5/2007 | Holliger | 29/772 |
| 2007/0108682 A1 | 5/2007 | Holliger | 269/37 |
| 2007/0163099 A1 | 7/2007 | Townsend et al. | 29/402.01 |
| 2009/0169353 A1 | 7/2009 | Townsend et al. | 414/806 |
| 2009/0188096 A1 | 7/2009 | Townsend et al. | 29/426.1 |

FOREIGN PATENT DOCUMENTS

| | | | | |
|---|---|---|---|---|
| EP | 0249402 | | 4/1987 | B65G 49/00 |
| EP | 0943394 A2 | | 10/1999 | B23O 19/04 |
| FR | 2416060 A | * | 10/1979 | B07C 5/02 |
| JP | 09-159433 | | 6/1997 | G01B 21/00 |
| WO | 99/04926 | | 2/1999 | B23P 19/04 |
| WO | 2004/052739 | | 6/2004 | B65D 19/31 |

\* cited by examiner

FIG. 4
(PART I)

FIG. 4 (PART II)

SOFTWARE AND METHODS FOR AUTOMATED PALLET INSPECTION AND REPAIR

RELATED APPLICATION

This is a divisional patent application of U.S. patent application Ser. No. 10/582,817 filed Jun. 14, 2006 now U.S. Pat. No. 7,958,624, which is a National Stage Entry of PCT/AU2004/01776 filed Dec. 17, 2004, which is a PCT application of Australian Patent Application No. 2003907024 filed Dec. 19, 2003. The entire disclosures of which are hereby incorporated herein by reference.

FIELD OF THE INVENTION

The present invention relates generally to the repair of wooden pallets, and specifically to an automated process for scanning pallets and identifying individual elements of the pallet for removal, replacement, or repair. It also applies to pallets constructed from other materials such as plastic, metal or composites.

DESCRIPTION OF RELATED ART

Commercial movement of materials typically uses a wooden pallet on which the material is placed or secured. This pallet is typically constructed with a flat upper deck consisting of planks or boards of timber nailed, screwed, or glued to parallel beams known as bearers or stringers. Bottom boards are similarly attached to the bearers. The framework allows the insertion of the "forks" of a forklift or other machine to raise and move the pallet and its load of materials. There are several pallet designs in use and are distinguished generally by place of manufacture and use. For example, pallets made and used in Australia, New Zealand, the United States, Canada, and Europe are all of different designs. In some designs, for example, blocks are used with or in place of bearers to separate the top and bottom boards. While timber pallets are the most common, pallets of other materials such as plastic, metal, or composite material are also in use.

During normal use, the pallets may be dropped, overloaded, crushed or otherwise damaged. Damaged pallets are often returned to the pallet provider or other supplier for inspection, repair or replacement. The inspection and decision process is currently done by skilled human inspectors, or by automated means that implement specific criteria, and decide if a pallet is damaged, and if so, decide to repair or discard the pallet. Using human inspectors is desirable because they can inspect and immediately repair each pallet at a single station. This can be done by presenting each pallet in turn, for example, on a conveyor, such that the inspector can see pallet, decide if damaged, and repair it or discard it. Human operators, on the other hand, are undesirable because the inspection and repair decision is not uniform, as each inspector will naturally implement repair based on his or her judgement. It is also undesirable from a safety point of view as accidents or injury may occur in such an environment.

Human operators may be replaced by an automated pallet inspection and repair apparatus. Some current automated systems use stereoscopic pairs of cameras to collect pallet geometry and topography information, then use computer programmes to make a repair or discard decision by uniformly implementing specific pallet criteria. This is done by first determining the pallet's design—e.g. Australian or European—then comparing the geometry and topography of the individual pallet against criteria for the pallet's design. Current systems, however, decide only to repair or discard each inspected pallet, that is, each pallet either does or does not pass the inspection criteria. If the pallet passes, it is placed back in service. If it does not pass, it is sent for repair. The repair process in current automated systems, however, is similar to the manual inspection process above. The pallets needing repair are sent by conveyor, past one or more human repair stations where the repairer inspects the pallet, determines what needs repair and then repairs it. In some cases, a pallet may be damaged to a degree that it is determined to be beyond repair and may be discarded. A process where the repairer makes this determination has an additional disadvantage that repairer may be inclined to declare a pallet beyond repair, as it is minimises the work to be done. Even in the best case, a system with an automated inspection and a human repairer has some of the same disadvantages (in uniformity and safety) of the totally human inspection and repair process.

What is needed is a process for automatically inspecting a pallet to determine if it needs repair. If no repair is needed, the pallet is placed back in service. If repair is needed, the pallet is sent to an automated repair station with a list of repairs to be made. The repair station receives the pallet and makes the listed repairs. Additionally, a determination may be made that the pallet is beyond repair, in which case, the pallet is sent to the repair station and is disassembled so that undamaged components may be re-used.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

An automated pallet inspection and repair system and apparatus comprises an inspection station connected to a computer. A pallet to be inspected is moved relative to the inspection head. The pallet may be on a conveyor or moved using a robotic manipulator or other device. Alternatively, the pallet may be in a stationary location and the inspection head may move across it. The sensing head comprises of a set of at least one laser and a camera, with the camera recording the reflected laser profile across a width of a pallet. Extra cameras can be used to scan wider areas but stereoscopic camera pairs are not needed. Resulting information from the sensing head is collected and processed by the computer to represent the geometry and topography of the pallet as a two-dimensional representation. The representation is analysed so that individual elements, (viz., boards, planks, bearers, blocks, etc.) are identified and located by coordinates. The pallet design is determined by the number, size, and location of the elements. The elements are analysed against specific criteria for the pallet's determined design. This includes criteria for the element alone (size, location, integrity, damage, missing or raised nails, etc.), inter-elemental criteria (spacing, overlap, etc.), and pallet design criteria (missing or superfluous elements, etc.). If the pallet is determined to have not passed the criteria, a list of specific repairs is generated. This list includes which element is to be repaired and the nature of the repair (remove, replace, reattach, repair, etc.). The data comprising the list of repairs to be made accompanies the pallet to a repair station, either physically or logically through the use of a tracking system. In preferred embodiments, the repair station is an automated repairer, for example, a robot arm using a nail gun, band saw or other saw, prying levers, etc., to implement the exact repairs determined necessary. After repair, the pallet is returned to service. If the pallet is determined to have passed the criteria, it is returned to service without stopping at the repair station. The analysis may also indicate that the pallet is not to be repaired, but rather disassembled. In this case, the list of repairs includes only the steps to disassemble the elements for re-use, and the parts that are to be reused and those that are to be discarded.

In the preferred embodiment, the present invention provides coordinate outputs sufficient to automate the component repairs, for example through robotic arm movements, band saw positioning and activation, nail placement, etc.

Figure 1:
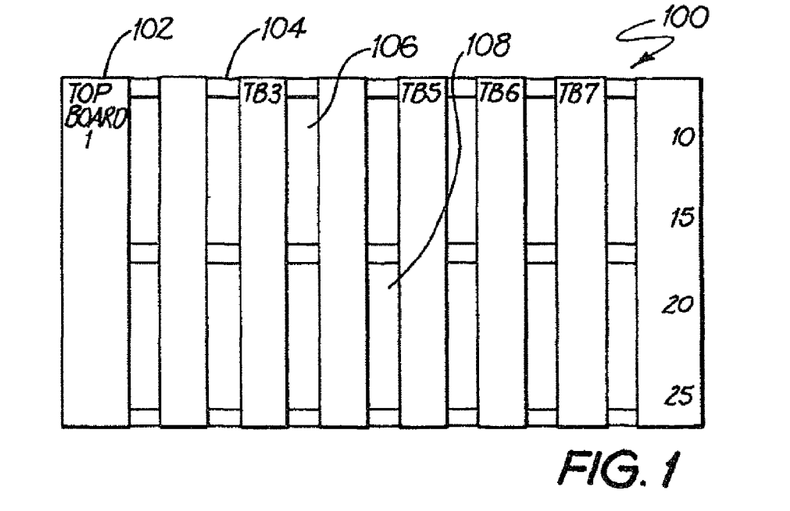
FIG. 1 is a schematic top plan view diagram of a pallet.

FIG. 1 illustrates one design of a pallet 100. The pallet consists of top boards 102, labelled TB 0 through 7, and corresponding bottom boards labelled BB0 through BB4. The top boards are supported by three horizontal bearers or stringers 104, 106, and 108, labelled B0, B1 and B2. Other designs will have different numbers of boards, different sized boards, and different spacing between boards, and may have different numbers and styles of bearers. Blocks and connector boards may be substituted for bearers in some designs. In the illustrated design, top board 0 and top board 7 are wider than the other six boards. For the purpose of this invention the pallet can be considered to be laid out in an orthogonal x-y-z configuration where the x-axis runs horizontally (with reference to FIG. 1) across the bottom of the pallet parallel to beam or bearer 108. The y-axis runs vertically (with reference to FIG. 1) along the left edge of top board 1. The z-axis is orthogonal to both x and y.

There are four processes that make up the preferred method of automated pallet inspection and repair. The first process is data capture. This means capturing all of the data about the physical or structural make up of a pallet that is required to make the determinations about the nature, extent and order of the repair process. The second process is the analysis of the captured data. The analysis simplifies the data and relates the data to known facts so that a repair process, using certain fixed processes can be specified. The third process is generating a list of detailed steps based on what repair processes are available and what repairs are needed, as determined by the data and analysis of it. The detailed steps necessary to make the repairs on a pallet is called a "recipe". The fourth process is to implement the recipe using automated equipment. In preferred embodiments, an industrial robot reads a step specified by the recipe and implements that according to a flexible programme. Each step is processed in turn.

One embodiment of the present invention consists of two computer systems and a mechanical means for moving pallets. These systems may reside on one or more physical computer processors or hardware, and may be distributed or collected. The first computer system is called the capture system, which collects information about the geometry and topography of the pallet. The second computer system is called the analysis system, which analyses the geometry and topography of the pallet and determines the pallet design and then using the pallet design specifications analyses the pallet and decides whether it is to be repaired or returned to service. It is not required that the two computer systems be separate or distinct. The mechanical means moving the pallet may be a conveyor belt or chain or a robotic arm or other system for transporting the pallet through the inspection head.

Figure 2:
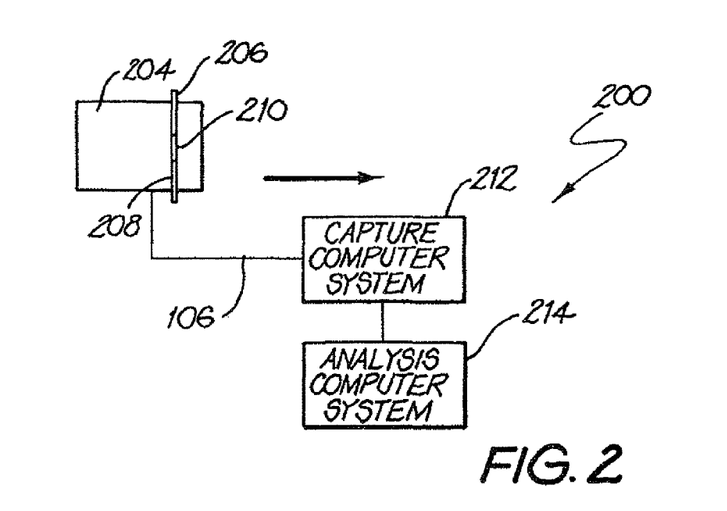
FIG. 2 is a schematic top plan view diagram of an inspection station.

FIG. 2 illustrates one implementation 200 of the mechanical means for moving pallets. This comprises a chain conveyor supporting a pallet 204 and moving it in the direction of the arrow, left to right. The pallet 204 moves under twin lasers 206 and 208. These lasers illuminate and sensors capture the entire width of the pallet 204. In some embodiments there is an overlap in the laser beams in the middle as shown by 210. As the pallet 204 moves under the lasers 206 and 208, information about the geometry and topography of a pallet is captured by cameras and sent to the capture computer system 212. Such laser and sensor systems are well known, as are the methods for using such lasers to collect this information. The system may be replicated to collect data on the other faces of the pallet simultaneously or asynchronously from the top deck. It will be obvious that this may also be achieved using a different number of laser and camera combinations than the twin set up described above.

The capture computer system 212 performs the following steps. First it collects the profile information of the pallet, that is, it collects the geometry and topography information from the lasers and sensors. The sensors return a stream of three-dimensional coordinates. The cameras/sensors are synchronised so that overlapping points illuminated by multiple lasers give the same coordinate values when viewed from each sensor or camera. The scans from the two lasers are then combined to give a set of coordinates for the entire width of the pallet. This process is repeated for each profile scanned as the pallet moves relative to the lasers and cameras When analysing the top deck, the scanned data is filtered to give only the top surface geometry and topography. This is accomplished by discarding any points that have a z-coordinate that is below a given threshold or filter line. This removes from analysis any point corresponding to a bearer or the bottom of the pallet or the transporting conveyor or robotic manipulator, for example. It will be obvious that the same process could be applied when analysing any specific face or deck of the pallet. In some embodiments, individual planes are established for each bearer. The planes can be combined, averaged or used as separate data references.

The laser scans are timed according to the speed of the pallet transport mechanism so that scans occur at regular distances along the length of the pallet in the direction of movement. Typically, this is set to scan at 1 mm linear distance, though it could be at any chosen resolution distance.

Next, the corner points of the pallet are found using a 45-degree filter. This locates the four points at the extremities of the pallet. That is, it finds the point of (minimum x minimum y (minimum x maximum y), (maximum x minimum y), and (maximum x maximum y). These four points determine the corners of the pallet. These are typically referred to as PP0, PP1, PP2, and PP3 respectively, where PP0 and PP2 lie on the x-axis, and PP0 and PP1 lie on the y-axis. PP0 and PP3 are diagonally, as are PP1 and PP2.

Next, the computer software finds the offsets between the image origin and pallet origin to give the x and y offset distances of the pallet. That is, it calculates the size of the pallet by subtracting combinations of PP0, PP1, PP2, and PP3. The data is also normalized by relocating the coordinates so that PP0 lies at the origin of the pallet coordinate system, and PP1 and PP2 lie on the x- and y-axis respectively. A second set of coordinates, based around the image datum, is used when calculating automatic repair parameters.

Figure 3:
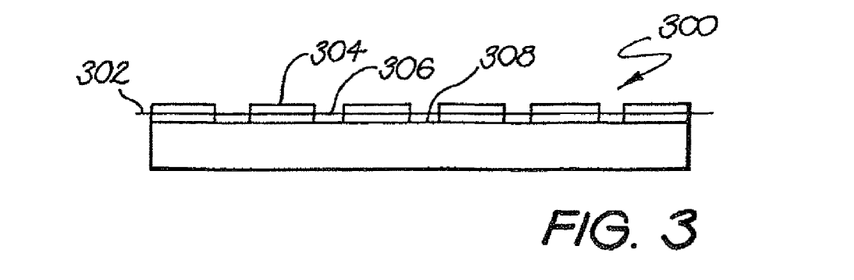
FIG. 3 illustrates a schematic side elevation of a pallet.

To convert from the three-dimensional topographical information to a two-dimensional geometric representation, first the locations and heights of the bearers (labelled B0, B1, B2) are found in the image by inspecting the profiles most likely to represent bearer locations. When the bearer heights and locations have been determined, a series of filter planes is drawn offset from the bearers (shown as element 302 in FIG. 3). This can also be achieved by finding planes best fitting the surface of the boards and drawing a filter plane offset below. Each point in the three dimensional representation is then checked against the corresponding filter plane. Points above the filter plane are identified as belonging to boards, points below belonging to bearers or other structural elements. The board points are then further filtered and assembled into arrays of points on board edges belonging together. This can be done using any standard edge finding technique applied to the set of points above the filter line and an edge chain following algorithm. These edge arrays represent boards or parts of boards and are used in later analysis. If a two dimensional (geometry only) scanning and inspection head is used, electronic means (e.g. sensor range restrictions) are used to filter the boards from other data, with the same array identification and assembly process taking place. The arrays do not contain height related data, only 2D geometrical position of points above the filter line.

The analysis computer system 214 performs the steps shown in Table 1.

TABLE 1

Figure 4:
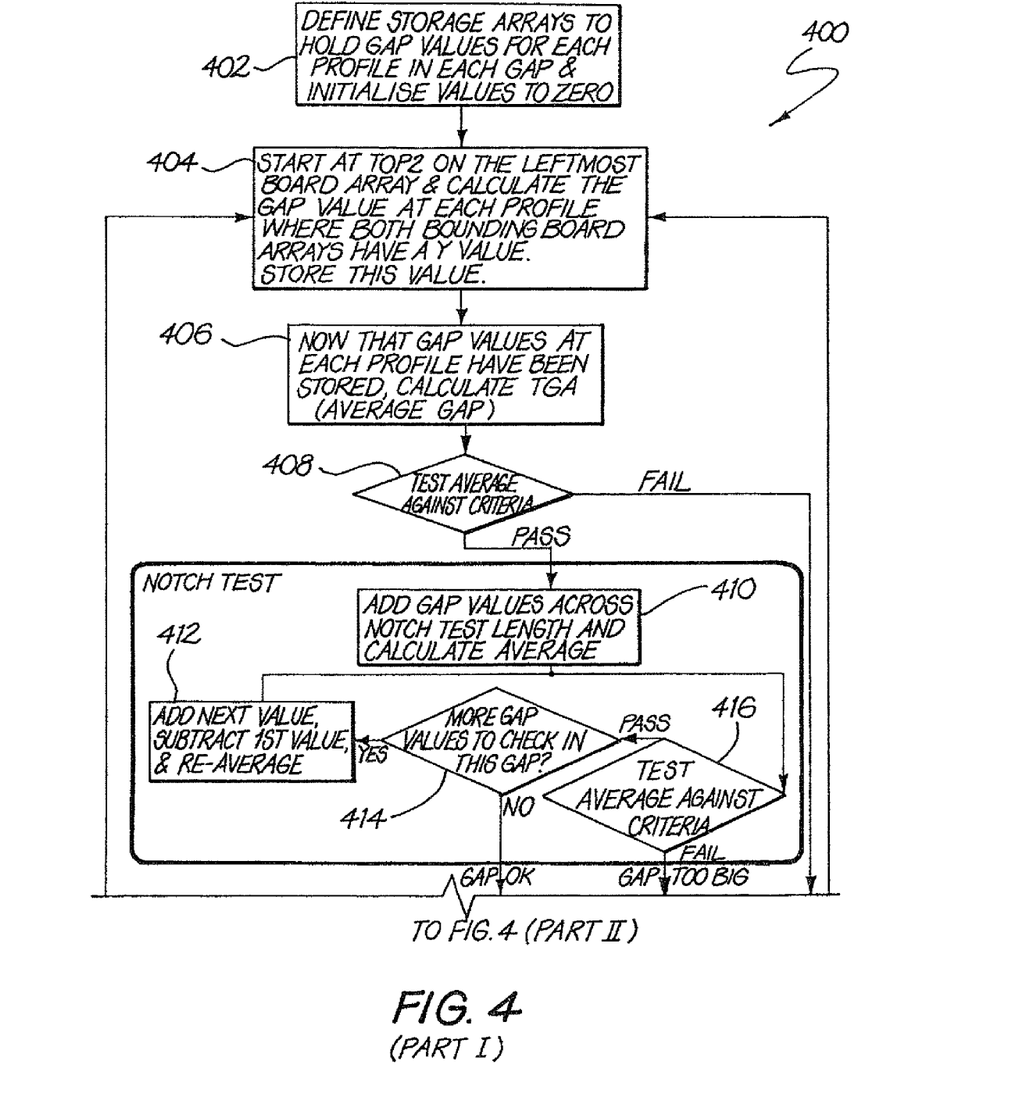
FIG. 4 illustrates a logic flow chart of a pallet repair process.

| Step | Description |
|---|---|
| 1 | The data stream from the inspection head is captured to construct a pallet model in computer memory. This process uses the known resolution of the inspection head and the known pallet velocity and distance from the sensing head to construct a three dimensional topographic model and subsequently a two dimensional geometric model of the pallet being analysed. Pallet corner points are calculated from topographical data and stored. |
| 2 | Geometric model is broken down to give arrays of points representing the edges of each board (and edges of partial boards) |
| 3 | Board arrays are checked for completeness (i.e. is the edge a closed loop?) and consistency (i.e. edges do not cross). Joined boards are split by applying a virtual edge along the most probable line of intersection between the boards. Where there are multiple arrays along a single line drawn parallel to the Y axis and these arrays are all less than a full board length in the Y direction and not overlapping or intersecting, they are classed as a single (broken) board. Board arrays are then sorted by their minimum X value, and their corner points are identified and stored. |
| 4 | By comparing the number, type and location of identified boards and the separation distance between pallet corner points with the range of possible known pallet geometries, a pallet type can be assigned to the pallet undergoing analysis, determined by the closest match against the database of specifications. This matching process can be accelerated if the system need only expect a single pallet style. A pallet that cannot be matched to a specific pallet style is marked as undefined and further analysis on it is halted. |
| 5 | Board types can be assigned (e.g. Intermediate, Lead, etc) to each board based on its location relative to pallet corner points and its approximate width (from board corner points). Boards within a specified region of the pallet corner points are presumed to be lead boards. |
| 6 | Pallet quality criteria are loaded from the database into the analysis system for the particular pallet type determined above. Each board array can be checked against the appropriate board criteria for that board type. Board checks may include board width, notches or missing material, jagged edges, excessive crookedness, or any other criteria. Any board array that fails these tests is marked as a board to be removed. Topographic data for the region corresponding to the board is also checked for board thickness, end splitting, cracks, holes and other three dimensional features, with failures again being recorded for removal. |
| 7 | The board arrays are examined against other quality criteria to determine if other non-removal board repairs are necessary. An example would be the position of the lead boards relative to the pallet corner points, with any lead board that is too far from the corner points marked to be adjusted, unless it has already been marked for removal. A hierarchy of board repair decisions is imposed with the board removal the highest precedence, board realignment next, and any other operation lowest. |
| 8 | Gaps are checked against gap criteria, such as gap width. Gaps that are larger than a board width are checked to see if a board will allowably fit into the gap with appropriate resulting gaps on either side (FIG. 4). If a board will fit, a phantom array is constructed to repretent the missing board, and it is marked for a board placement operation. |
| 9 | All results are stored in the database. At this point, all arrays are marked as either valid boards, or as boards to be removed, adjusted or operated on. |
| 10 | When this system is implemented in an automated pallet repair situation, further calculations and data manipulation are required. These calculations are specific to each machine in the repair cell, and might include the location (X, Y & Z position and angles) required to insert a bandsaw blade into a particular gap to perform the removal operation for a board that has been marked for removal. Where this blade does not fit into the gap, the board is marked for removal with a different device. |
| 11 | A recipe is generated for the repair cell, with a list of operations (jobs) required to be performed to repair the pallet, and the associated data for each of these jobs. These are sorted to expedite the repair cycle time |
| 12 | In an inspection system designed for sorting or for quality control purposes only, steps 10 and 11 are removed, and replaced by further topographic analysis of protruding nails and other features. |

FIG. 4 illustrates the logic flow for step 8 in Table 1, the process for examining the gaps 400. The software defines the storage arrays to hold gap values to use for each of the profiles 402. Each gap is initialized to zero. Starting with the right hand edge of the left most board, the gap values are calculated for each board as shown in step 404. In step 406 the gap values for each board have been stored, so the average gap can be calculated. In step 408 the average gap is compared against the criteria for gap based on the pallet design. If the gap is larger than the design criteria, the gap is marked as a bad gap, shown in step 418. In step 420, the bad gap is examined to see whether it is large enough to fit a new board. If it is large enough to fit in a board, step 424 calculates how many boards will fit into the gap. That number of boards is then indicated for the repair orders. The software then moves to step 422 to examine the next gap. However, if the decision made at step 420 is that the gap is not wide enough to fit in the new board and it still exceeds the criteria for the maximum gap, then step 428 is performed. Step 428 determines which boards must be removed and replaced to fix the gap.

In step 430 a check is made to see if one of the bounding boards is crooked. If the bounding boards are crooked, the offending board is indicated for removal and replacement or repositioned, and the resulting gap is re-evaluated 426. If none of the bounding boards are crooked 430, then a check is made to see if one of the boards is missing any wood (or other material for non-timber pallets) 432. If one of the boards is missing material, 432, an order is indicated to remove the board and re-evaluate the resulting gap in step 426. In step 432, if no boards are missing any material, then step 434 is performed. A check of the neighbouring gaps is made. If one of the neighbouring gaps is smaller than the other then an order is indicated to remove the board and re-evaluate the resulting gap step 426. If in step 434 the gaps are equal size then step 436 is performed, that is, the pallet is marked for manual inspection, or alternatively a decision can be made to arbitrarily remove one of the boards.

With reference to step 408, the average gap is compared against the design criteria, and if the average gap is acceptable, a test is made to determine if there is a notch in the board. Such a notch would give a false indication of a bad gap. The notch test is shown in steps 410 through 416. At 410, the gap values across the notch length are added and the average calculated. In step 416, the calculated average is compared to the design criteria. If the average is greater than the design criteria and the gap is too big processing continues to step 418 described above. If at step 416, the average gap passes the test against the design criteria that a check is made in step 414 to determine if there are more gap values to check. If there are more to check, the step 412 is performed to add the next value and then subtract the first value and recalculate the average. Processing then continues and step 416. If at step 414 there are no more gap values to check, then it has been determined that all gaps values are acceptable and processing continues at step 422 to move to the next gap. If there are no more gaps to test, then processing ends at step 438.

Returning now to step 426, a repair order indicates the removal of a board or the reposition it. Processing then continues at 404 to recalculate the average gap.

In this way, the pallet is examined board by board and repair orders are stored for later use or the pallet is returned to service. If the pallet needs repair, specific instructions are determined for removing, replacing, repositioning boards, or to add one or more boards, or to remove a protruding nail.

This provides a technical advantage over current automated pallet inspection and/or repair systems, which only determine a pass-fail decision for the pallet's suitability, and no specific repair instructions are generated. In addition, the technique of the present invention is sufficient to automate the repair process by connecting the output of the process to an automated repair station. Such a station could comprise a robot arm which grasps the pallet to be repaired, then, using a band saw and nail gun and other devices, removes and replaces specified boards. The instructions to the robot arm would be to, for example, "remove the board located between 22.5 cm and 40 cm from the leading edge, then nail a new board at 22.0 cm from the leading edge."

This same logic may be applied to the inspection of and repositioning of or replacement of the bearers, or alternatively to the lower deck of the pallet.

Controlling the robot in an automated repair cell based on the information generated by the pallet analysis system described above requires specific robot, PLC and computer system linkages or interfaces and software.

Traditional robot control design is relatively simple, based around the premise that the robot performs a repeatable job (or series of repeatable jobs) that can be predefined at the time the system is designed. Further, traditional robot systems require human intervention when there is a problem or a robot crash. To use a robot for pallet repair, it must dynamically change its program for each pallet to be repaired, based on the particular operations required and the location of the boards or gaps to which these operations must be applied. Further, it must automatically recover from problems and minor crashes, and flag major crashes to an operator. To achieve this, the software system for cell control is broken into three components—these are the robot controller, the programmable logic controller (PLC) and the repair recipe generation sub-system described in Steps 10 and 11 of Table 1. The recipe generation sub-system loads the necessary robot operations and associated position data into the PLC. This can be done in a single batch for a whole pallet, or sequentially as required. In preferred embodiments the data is sent as a single batch. Data is checked for consistency and completeness, and any missing data is flagged to the recipe generation system.

The robot controller contains a master job and a series of sub-jobs that the master job can call when required. The master job communicates with the PLC. The PLC tells the master job on the robot controller which sub-job to call, and sends it the data that this sub job will need to run, for example the location and angle of a particular board to be operated on. This data is confirmed by the master job to the PLC, with the master job waiting for a handshake from the PLC before continuing. On receipt of the handshake, the sub job is called. The first task in each sub-job is to check the robot's current location. The position and angle of the pallet gripper must be within a certain envelope (which may be a sphere or a cylinder around a predefined point or line known as the sub job home position) for the operation to continue. If the robot is within the allowable envelope, the sub job continues with the operation. At each step of the operation, a handshake is exchanged with the PLC. This handshake allows the PLC to monitor the point in the sub-job that the robot is up to, which is required for any automatic recovery operations. When the sub job is finished (or if an error is encountered) control of the robot is passed back to the master job, which communicates with the PLC to get the next sub-job, and the process continues until the recipe is complete.

Each device in the repair cell is numbered, starting with device 02 and working up to device 99 (this system could be extended to use any number of digits depending on the number of devices in the cell, however two digits are used in preferred embodiments). Robot sub-jobs that occur at each of these devices are named after the device where they occur, e.g. a two-digit code. The sub jobs that control travel between machines are named by combining the names of the two devices between which the robot must move (e.g. the sub-job for moving from machine 12 to machine 34 would be 1234, whereas to move from 34 to 12 would be 3412). These numbers are generated by the repair recipe sub-system and passed as part of the recipe. The PLC then passes these names in turn to the robot master job, which then calls the matching sub-job.

Some numbers are reserved for emergency or other recoveries, namely devices 00 and 01. This allows recovery sub jobs to be defined for each device as XX00 and XX01 where XX represents the device name. Recovery jobs generally reverse out through the steps previously performed at that machine, back to the robot home position for that device (e.g. if sub-job 03 runs into trouble, the recovery job would be 0300 or 0301, depending on the alarm generated). Depending on the alarm condition, the current recipe step is tried again, or the alternatively the recipe is changed dynamically to overcome the problem. For example, if the removal of a board to be removed with device 03 fails, and device 04 is also designed to remove boards, extra steps can be added to the recipe dynamically to take the pallet to device 04 and perform the removal operation. Depending on the particular recipe, this action may take place immediately, or after the completion of any other pending operations at device 03.

The system relies on the PLC being in ultimate control at all times, and for handshakes between the robot and the PLC between any operations, no matter how small. For safety purposes, all robot operations must check their start position and confirm this with the PLC.

An alternative embodiment of the recipe system would be in a repair cell where the pallet is held in a single location and the inspection head and repair devices are brought to it. The pallet analysis would proceed as per the earlier description, as would the recipe generation. In this style of embodiment, rather than the PLC instructing the robot to take the pallet to a particular repair device, the PLC instructs the robot (or other manipulator) to bring the repair device to the pallet. The transfer of position data is identical to the above description, as are the handshaking and robot location checking procedures.

We claim:

1. A method for automated inspection and repair of a pallet, the method comprising the steps of:
    a) moving the pallet relative to an inspection station having a laser and a camera connected to a computer,
    b) collecting three-dimensional coordinate data, the data having an x-, a y-, and a z-coordinate, from the reflected laser light using the camera and sending the data to the connected computer,
    c) analyzing the coordinate data and determining a pallet design, the analyzing comprising
        converting the three-dimensional data to a two-dimensional data by discarding data having a z-coordinate exceeding a threshold,
        creating a two-dimensional representation of the pallet,
        locating the corners of the representation of the pallet,
        identifying the elements of the pallet from the representation, and
        classifying the elements by kind, counting the number of elements by kind, determining the pallet design from the number and kind of the elements,
    d) retrieving a set of criteria from a database based on the pallet design,
    e) identifying an element of the pallet by examining the coordinate data,
    d) comparing the element to the criteria,
    e) if the element fails the criteria, creating a repair step,
    f) collecting all repair steps into a recipe,
    g) passing the recipe to an automated repair station, and
    h) executing the recipe.

2. The method of claim 1, wherein: the step of creating a repair step further comprises the steps of: identifying the element to be repaired, selecting a type of repair, selecting a tool to perform the repair step, encoding the repair step into a computer-readable format.

3. The method of claim 1, wherein: the automated repair station comprises: a robot controller that activates and positions a robot arm, the controller having a master job and a series of sub-jobs, a programmable logic controller in communication with the master job, and a repair sub-system having a repair tool under the control of a sub-job.

4. An method for operating a pallet inspection station comprising at least one laser, at least one camera and a processor coupled to the at least one camera, the method comprising:
    operating the at least one camera to collect light from the at least one laser after being reflected from a pallet comprising a number of elements to be inspected; and
    operating the processor to run an analysis software to perform the following
        receiving from the at least one camera a stream of three-dimensional points, each point having an x-, a y-, and a z-coordinate,
        filtering the stream of three-dimensional points to obtain a top surface geometry and topography by discarding points having a z-coordinate below a threshold,
        locating four corner points from the stream of three-dimensional points, the corner points having coordinates of (minimum x, minimum y), (minimum x, maximum y), (maximum x, minimum y), and (maximum x, maximum),
        identifying edges of each element based on the four corner points, thereby identifying a type and number of each element,
        determining a pallet design from the type and number of each element,
        loading a set of criteria from a database based on the pallet design, and
        comparing each element of the pallet to the set of criteria to construct a list of repairs.

5. The method of claim 4 wherein operating the processor to run the analysis software further comprises creating a repair recipe from the list of repairs.

6. The method of claim 4, further comprising moving the pallet relative to the at least one laser.

7. The method of claim 4, wherein the element type is selected from a list comprising any of a top board, a leading board, an intermediate board, a bearer, a stringer, a block, and a bottom board.

8. The method of claim 4, wherein the pallet inspection station comprises a repair station, and further comprising repairing the pallet based on repair recipe.

9. A method for operating a pallet inspection station comprising:
    operating at least one laser to direct light toward a pallet comprising a number of elements to be inspected;
    operating at least one camera to collect the light reflected from the pallet, and generating three-dimensional points based on the reflected light, with each point having an x-, a y-, and a z-coordinate; and
    analyzing the reflected light based on the following
        filtering the three-dimensional points to obtain a top surface geometry and topography by discarding points having a z-coordinate below a threshold,
        identifying a type and number of each element based on the top surface geometry and topography,
        determining a pallet design from the type and number of each element, and
        comparing each element of the pallet to a database to generate a list of repairs.

10. The method of claim 9 wherein analyzing the reflected light further comprises generating a repair recipe from the list of repairs.

11. The method of claim 9 wherein analyzing the reflected light further comprises further comprises:
    locating four corner points from the three-dimensional points, the corner points having coordinates of (minimum x, minimum y), (minimum x, maximum y), (maximum x, minimum y), and (maximum x, maximum y); and
    identifying edges of each element based on the four corner points, thereby identifying the type and number of each element.

12. The method of claim 9, further comprising moving the pallet relative to the at least one laser.

13. The method of claim 9, wherein the element type is selected from a list comprising any of a top board, a leading board, an intermediate board, a bearer, a stringer, a block, and a bottom board.

14. The method of claim 9, wherein the pallet inspection station comprises a repair station, and further comprising repairing the pallet based on repair recipe.

* * * * *

UNITED STATES PATENT AND TRADEMARK OFFICE
CERTIFICATE OF CORRECTION

Page 1 of 1

PATENT NO. : 8,881,360 B2
APPLICATION NO. : 13/102414
DATED : November 11, 2014
INVENTOR(S) : Townsend et al.

It is certified that error appears in the above-identified patent and that said Letters Patent is hereby corrected as shown below:

On the title page item 62, Related U.S. Application Data

Delete: " Division of application No 10/582,817 filed as application No, PCT/AU2004/001776 on Dec. 17, 2004"

Insert: -- Division of application No. 10/582,817 filed June 14, 2006, now Patent No. 7,958,624, which is a 371 of PCT/AU2004/01776 filed December 17, 2004. --

Signed and Sealed this
Seventh Day of April, 2015

Michelle K. Lee
*Director of the United States Patent and Trademark Office*